HERRINGTON & RICHARDS.
Corn Planter.
No. 81,502.  Patented Aug. 25, 1868.
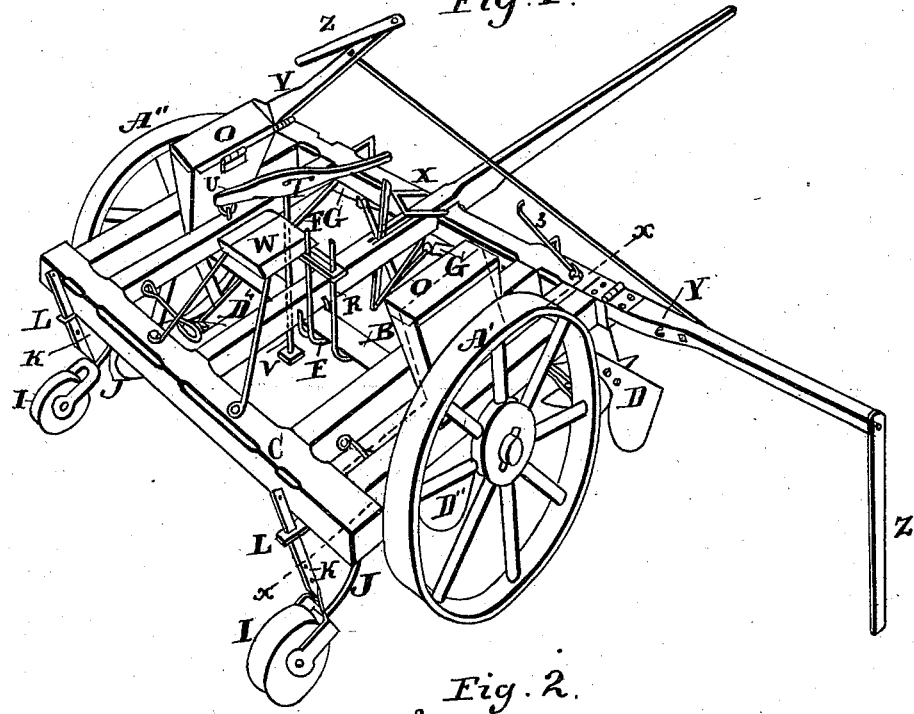
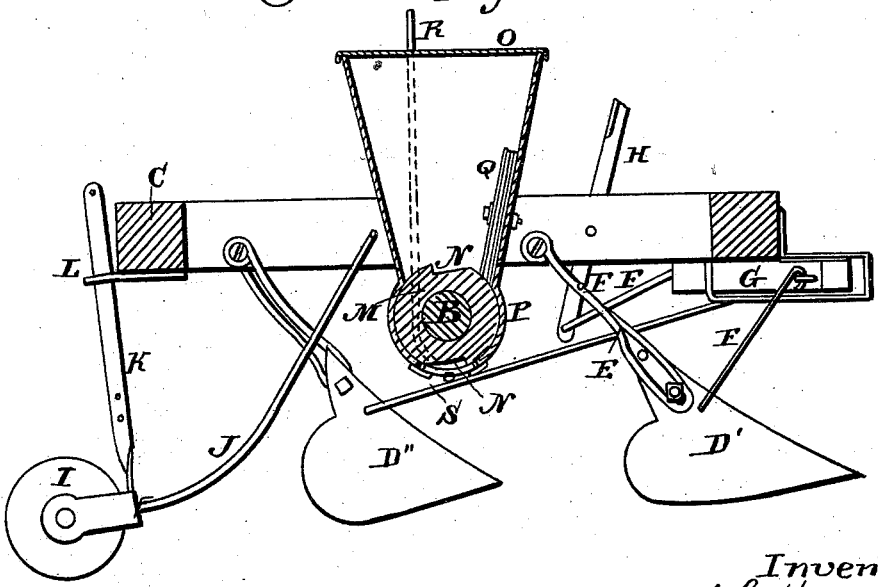

United States Patent Office.

ALBERT E. HERRINGTON AND JOHN D. RICHARDS, OF BIG PRAIRIE RONDE, MICHIGAN.

Letters Patent No. 81,502, dated August 25, 1868.

IMPROVEMENT IN CORN-PLANTERS.

The Schedule referred to in these Letters Patent and making part of the same.

TO WHOM IT MAY CONCERN:

Be it known that we, ALBERT E. HERRINGTON and JOHN D. RICHARDS, of Big Prairie Ronde, in the county of Kalamazoo, and State of Michigan, have invented a new and useful Improvement in Machines for Planting Corn; and we do declare that the following is a true and accurate description thereof, reference being had to the accompanying drawings, and to the letters of reference marked thereon, and being a part of this specification.

Figure 1 shows a perspective view of our apparatus.

Figure 2 is a sectional view on the line X X in fig. 1.

The same letters indicate like parts in each figure.

The object of this invention is to construct an economical machine, for the purpose described, that, by a proper arrangement of teeth and rollers, the ground may be suitably opened to receive the seed, which will be covered by the rollers; that will drop the seed at given distances in one or two rows, as may be desired, and in any required quantity; and that will mark the lines in which succeeding rows should be planted.

In order to accomplish this object, we construct two wheels, A' and A'', one of which, A'', is rigidly attached to the axle, B, while the other, A', is loosely sleeved upon the opposite end of the same axle B.

Surmounting and properly attached to said axle, is placed the frame C, to which are secured the cultivator-teeth, the outer ones being intended to remove stones or other obstructions from the front of the wheels.

The teeth, D', are attached to proper arms, E, which are pivoted to the frame, and by other arms, F, are connected to the vibrating-bars G, which are operated by the levers H, with connecting-rods, F', to raise or lower the teeth D', and govern the depth of the furrow in which it is desired to drop the seed.

The teeth D'' are attached to the frame C in the rear of the points whence seed is dropped, and are so arranged as to fill the furrow opened by the teeth D', and cover the seed when dropped.

The rollers, I, are properly attached to arms J, which lead forward, and are pivoted to the frame, and are provided with vertical guides, K, which work loosely in the slots in the ears L, which are fastened to the rear bar of the frame.

Upon the axle, near its outer ends, are fitted, and rigidly attached thereto, collars, M, provided in their peripheries, at proper distances apart, with openings, N.

These collars are provided and surmounted with hoppers or seed-boxes, O, in the bottoms of which the collars M rotate with the axle B.

These hoppers or seed-boxes are provided with brushes, Q, properly attached to the sides of the hoppers, the lower ends of which rest against the peripheries of the collars, and strike the seed into the opening N.

Extending from the bottom of the hoppers around the collars, are the shields, P, provided at their lower extremities with openings to correspond with the openings or cavities, N, in the collars.

These openings in the shield are provided with slides, to open or close them, as may be desired, which are operated by the levers S, extending under the axle B to vertical levers R, which are placed within reach of the operator.

T is a lever, hinged at U to the frame, and provided with a standard, V, which may be used by the operator to elevate the end of the apparatus, by resting the standard V on the ground, to regulate the setting of the machine, in starting to plant the rows.

W is the driver's seat, and X a clamp, to hold the levers H in place, when it is desired to raise the teeth D' out of the ground.

Y are arms, hinged at suitable parts of the frame C, their outer extremities being provided with pendants, Z, of any description, which, when the arms are lowered to a horizontal position with the frame, will mark the rows to be subsequently planted, and these arms are so connected by means of a rod, Z', that whenever one is raised, the other is lowered, as seen.

When not required, these arms may be elevated out of the way, and held in position by the hook 3, or any other device.

What we claim as our invention, and desire to secure by Letters Patent, is—

1. The combination of the collars M, on the axle B, with the shields P, provided with openings and slides, which latter are operated by levers R S, all arranged and operating substantially as described, and for the purposes set forth.

2. The combination of lever H and arms F F' with the vibrating-bars G and teeth D', arranged to operate substantially as and for the purposes set forth.

3. In combination with the above, the lever T, hinged at U, and provided with standard V, to operate the frame C, substantially as and for the purpose set forth.

ALBERT E. HERRINGTON,
JOHN D. RICHARDS.

Witnesses:
   H. F. EBERTS,
   GEO. V. MANCHESTER.